United States Patent

Wada

Patent Number: 5,159,555
Date of Patent: Oct. 27, 1992

[54] CONTROL APPARATUS FOR SUPPORT UNIT OF VEHICLE

[75] Inventor: Shunichi Wada, Himeji, Japan

[73] Assignee: Mitsubishi Denki K.K., Tokyo, Japan

[21] Appl. No.: 511,693

[22] Filed: Apr. 20, 1990

[30] Foreign Application Priority Data

Apr. 22, 1989 [JP] Japan ................................ 1-102820

[51] Int. Cl.$^5$ ..................... B60G 17/015; B60G 21/00
[52] U.S. Cl. ............................... 364/424.05; 280/707; 395/900; 395/905
[58] Field of Search ...................... 364/424.05, 426.04; 280/707, 840, 703; 395/3, 900, 905

[56] References Cited

U.S. PATENT DOCUMENTS

| | | | |
|---|---|---|---|
| 4,648,622 | 3/1987 | Wada et al. | 280/707 |
| 4,789,935 | 12/1988 | Buma et al. | 364/424.05 |
| 4,796,911 | 1/1989 | Kuroki et al. | 280/689 |
| 4,897,776 | 1/1990 | Urababa et al. | 364/424.05 |
| 4,903,983 | 2/1990 | Fukushima et al. | 364/424.05 |
| 4,916,632 | 4/1990 | Doi et al. | 364/424.05 |
| 4,930,084 | 5/1990 | Hosaka et al. | 364/426.04 |
| 5,058,017 | 10/1991 | Adachi et al. | 364/424.05 |
| 5,060,157 | 10/1991 | Tado et al. | 364/424.05 |

FOREIGN PATENT DOCUMENTS

0385723 9/1990 European Pat. Off. .

Primary Examiner—Vincent N. Trans
Attorney, Agent, or Firm—Sughrue, Mion, Zinn, Macpeak & Seas

[57] ABSTRACT

A control apparatus for support unit of vehicle, wherein a physical quantity which affects characteristics of a support unit for supporting a vehicle body such as a suspension or stabilizer and a state quantity which shows movement of the body or support unit are detected. The similarity corresponding to the detected physical quantity and state quantity is calculated using fuzzy logic, request indexes of comfort to ride and operation stability are calculated from the similarity. The request indexes are composed to obtain the center of gravity, so as to judge the most optimum characteristics of the support unit. This control apparatus automatically substantially analoguely judges whether either of the comfort to ride or the operation stability should be prioritized.

17 Claims, 6 Drawing Sheets

Fig. 9

CONTROL APPARATUS FOR SUPPORT UNIT OF VEHICLE

BACKGROUND OF THE INVENTION

1. Field of the Invention

The present invention relates to a control apparatus for controlling characteristics of a support unit which supports a vehicle body including a suspension and/or stabilizer in order to obtain the most advantageous characteristics using fuzzy logic with respect to the state of the traveling vehicle.

2. Description of Related Art

When a vehicle is traveling, in order to have a comfortable ride, characteristics of a support unit of a vehicle body should be adapted to be SOFT. More specifically, the damping force of a suspension should be reduced, a spring constant of the suspension should be made smaller to be softer, and the torsion quantity of the stabilizer should be lessened. On the other hand, to achieve higher operation stability, the characteristics of the support unit of the vehicle body should be made HARD. That is, the support unit should be adapted such that the damping force of the suspension is made larger, the spring constant of the suspension is heightened to be tighter, and torsion quantity of the stabilizer is made greater.

Then, there has been developed a system which switches the characteristics of the support unit to SOFT (or MEDIUM in between HARD and SOFT) when the vehicle is normally traveling and to HARD when conditions of the road surface change by driving an actuator for the support unit.

As this type of system, there are control apparatus disclosed in, for example, U.S. Pat. Nos. 4,789,935 and 4,796,911. In conventional control apparatus as described above, there have digitally been processed such subjective and vague factors as operation stability and comfort to ride in the vehicle which affect the characteristics of the support unit. In other words, those conventional control apparatus employ a method of digital decision, by which such factors as mentioned above are prioritized and processed to be binary by a predetermined threshold, and according to this processed result, the characteristics of the support unit can be judged. There, then, exists a problem in the conventional control apparatus that the characteristics of the support unit cannot be sufficiently judged so that the support unit cannot be controlled with high accuracy. And, there exists another problem in that there is no clear reference point to prioritize both of these factors.

In addition, once the characteristics of the support unit have been set to be in a HARD mode, the state of this HARD mode is adapted to be maintained for a predetermined period of time in order to prevent hunting of the actuator of the support unit. Factors to affect the characteristics of the support unit are normally transient, and once the characteristics of the support unit have been set to the HARD mode because of such transient factors, the characteristics can not be put back to be the SOFT (or MEDIUM) mode, even if the driver wishes. Thus, there exists a problem that the most advantageous control for the characteristics of the support unit cannot be performed.

SUMMARY OF THE INVENTION

It is an object of the present invention to provide a control apparatus for a support unit of a vehicle which can more accurately control characteristics of a support unit for supporting a vehicle body.

It is another object of the present invention to provide a control apparatus for support unit of a vehicle which can automatically substantially judge in an analogue manner to prioritize either the comfort of the ride of the vehicle or operation stability which is originally difficult to manually judge.

It is a further object of the present invention to provide a control apparatus for a support unit of a vehicle which can readily handle the detected quantity of the instantaneous state for forecasting movement of the vehicle body as a fuzzy variable.

It is still a further object of the present invention to provide a control apparatus for a support unit of a vehicle which can more precisely control the characteristics of a suspension and/or stabilizer with few controlling rules.

The control apparatus for a support unit of a vehicle of the present invention is provided with detecting means for detecting a physical quantity which affects the characteristics of a support unit for supporting a vehicle body such as a suspension or stabilizer and state quantity which shows movement of the vehicle body or support unit, calculating means for calculating similarity corresponding to the detected physical quantity and state quantity according to a fuzzy rule and calculating request indexes of comfort to ride and operation stability, judging means for judging the characteristics of the suspension or stabilizer by composing the request indexes to obtain the center of gravity, and adjusting means for adjusting the characteristics of the support unit in response to outputs of the judging means.

More specifically, the characteristics of the support unit designate the damping force or spring constant of the suspension, or the torsion quantity of the stabilizer.

When higher characteristics of the support unit are judged by the judging means, the state of this higher characteristics is maintained for a predetermined period of time. And during that period of time, where more than the predetermined number of times of lower characteristics than the present have been judged by the judging means, the present characteristics are converted into these lower characteristics, and the state of these lower characteristics is maintained for a predetermined period of time.

As a method for precisely calculating the request indexes, a variety of methods can be implemented. There may be employed a method for calculating the request index by setting a plurality of frequency ranges of vertical acceleration of the vehicle body as a fuzzy variable and calculating a similarity between the vertical vibration and the traveling state of the vehicle body. There may be employed another method for calculating the request index by setting a combination of a vehicle speed and a steering angle speed as a fuzzy variable and calculating similarity between the fuzzy variable and the roll state of the vehicle body. There may be employed a further method for calculating the request index by setting a combination of the vehicle speed and the transverse acceleration of the vehicle body as a fuzzy variable and calculating similarity between the fuzzy variable and the roll state of the vehicle body. There may be employed a still further method for calculating the request index by setting a combination of the vehicle speed and the throttle opening speed as a fuzzy variable and calculating a similarity between the fuzzy variable and the posture change in a longitudinal direction of the vehicle body.

The above and further objects and features of the invention will more fully be apparent from the following detailed description with the accompanying drawings.

DESCRIPTION OF THE PREFERRED EMBODIMENTS

Figure 1:
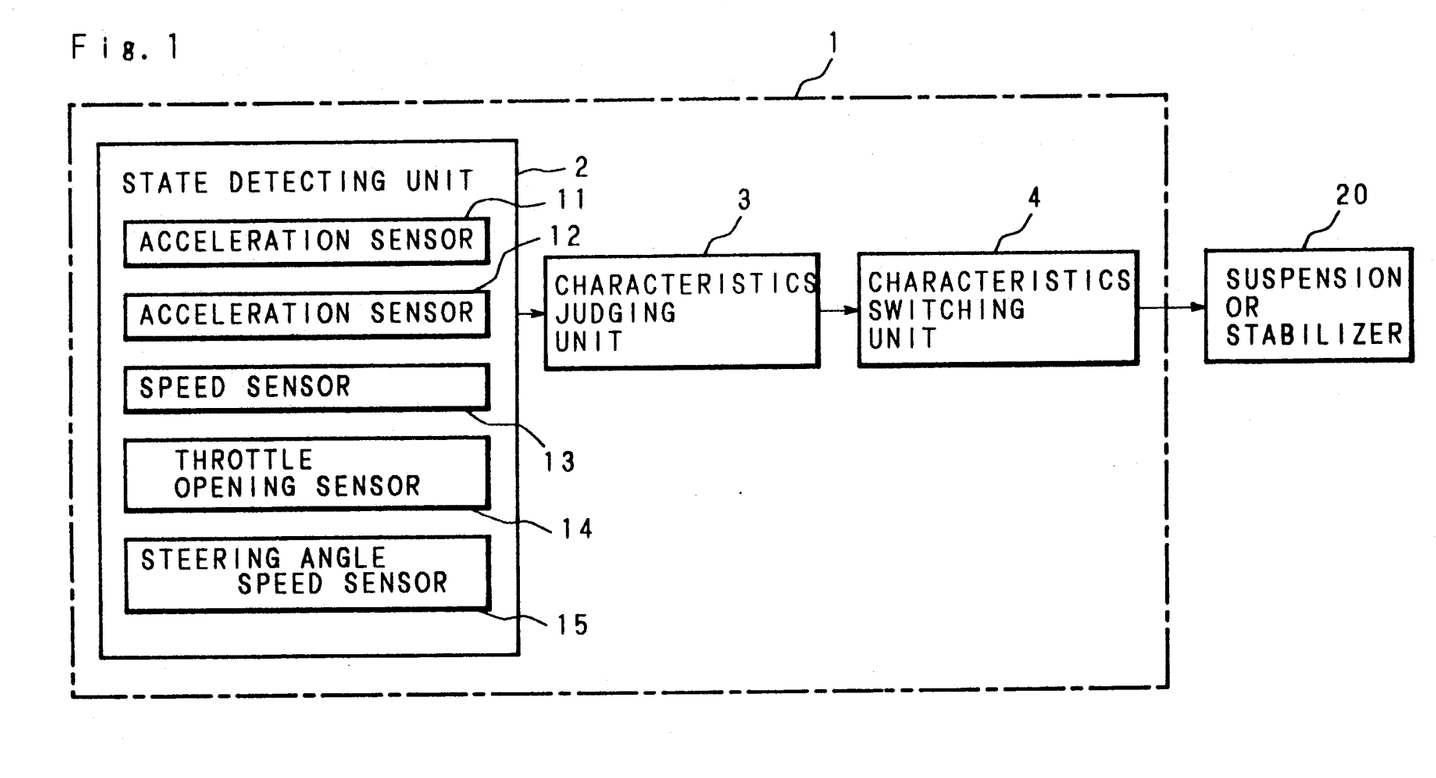
FIG. 1 is a block diagram showing construction of a control apparatus for a support unit of a vehicle of the present invention.

FIG. 1 is a block diagram showing a construction of an embodiment of the present invention. In the figure, reference numeral 1 designates a control apparatus for a support unit of vehicle of a the present invention, and reference numeral 20 designates a support unit to be controlled, that is, a suspension or a stabilizer. The control apparatus 1 is provided with a state detecting unit 2 composed of a variety of sensors for detecting the traveling states of a vehicle, a characteristics judging unit 3 which judges characteristics of the suspension or stabilizer 20 using fuzzy logic in response to an output from the state detecting unit 2, and a characteristics switching unit 4 which switches the characteristics of the suspension or stabilizer 20 in response to an output from the characteristics judging unit 3.

The state detecting unit 2 is provided with an acceleration sensor 11 for detecting vertical acceleration of the vehicle body, an acceleration sensor 12 for detecting transverse acceleration of the vehicle body, a speed sensor 13 for detecting a vehicle speed, a throttle opening sensor 14 for detecting the opening of a throttle valve, and a steering angle speed sensor 15 for detecting a steering angle speed.

Figure 2:
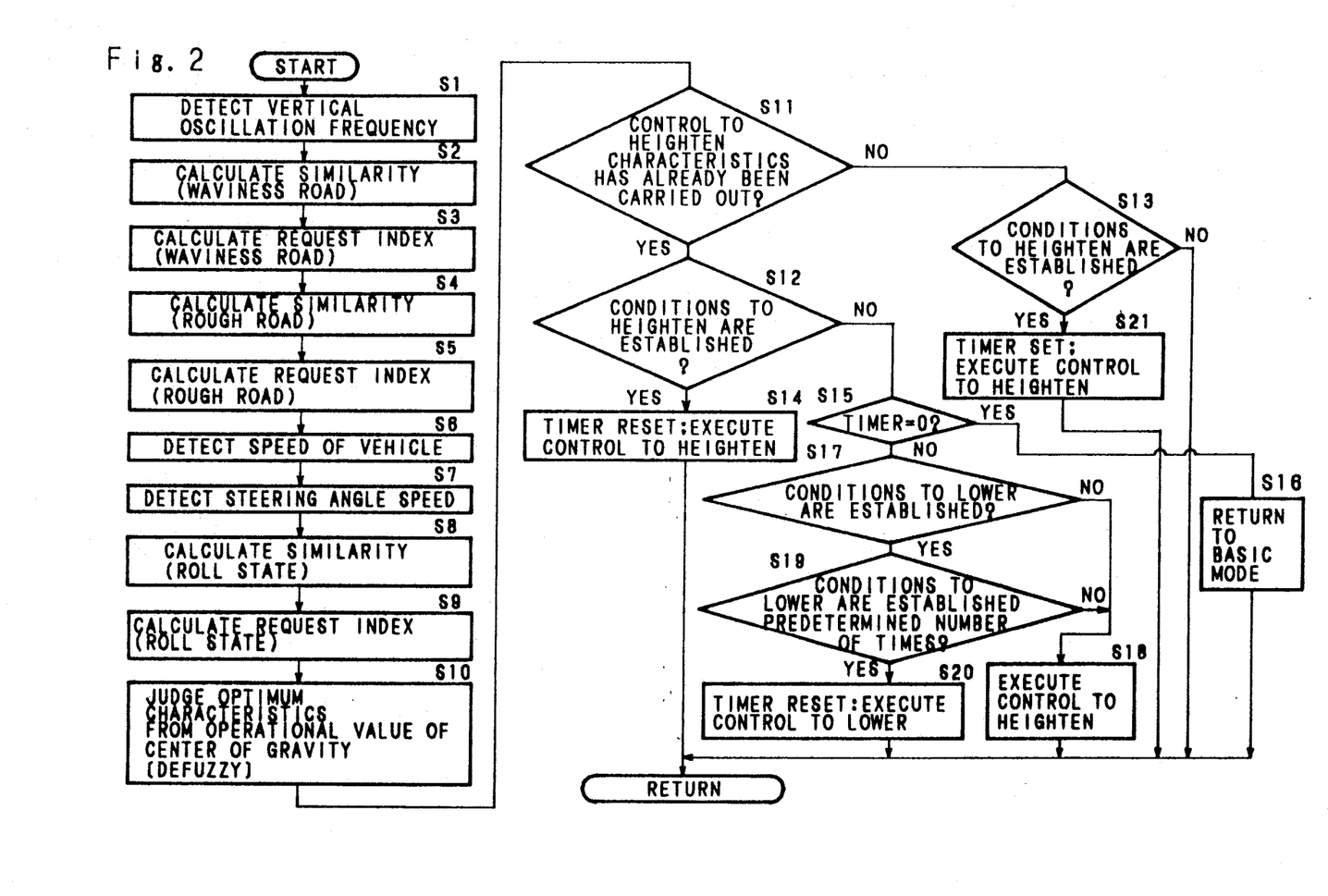
FIG. 2 is a flow chart showing operation of the control apparatus for a support unit of a vehicle of the present invention.

Described below is the functional operation of the embodiment. Traveling information of the vehicle is outputted from each of the sensors 11, 12, 13, 14 and 15 which are located in the state detecting unit 2, to the characteristics judging unit 3. According to the traveling information, the characteristics judging unit 3 judges the characteristics of the suspension or stabilizer 20 using fuzzy. In the embodiment, an explanation will now be provided regarding how the damping force or spring constant of the suspension, or the torsion quantity of the stabilizer is judged. And those characteristics are adapted to be switched into such three modes such as SOFT, MEDIUM, and HARD. FIG. 2 is a flow chart showing operation in both the state detecting unit 2 and the characteristics judging unit 3 as will now be described.

At Step S1, a vibrational frequency in the vertical direction of the vehicle body is detected. In other words, in the acceleration sensor 11 shown in FIG. 1, the magnitude of the vertical vibration of the vehicle body and the vibration frequency are detected, and the vibration of more than a predetermined magnitude is divided into a plurality of ranges to be judged.

Figure 3:
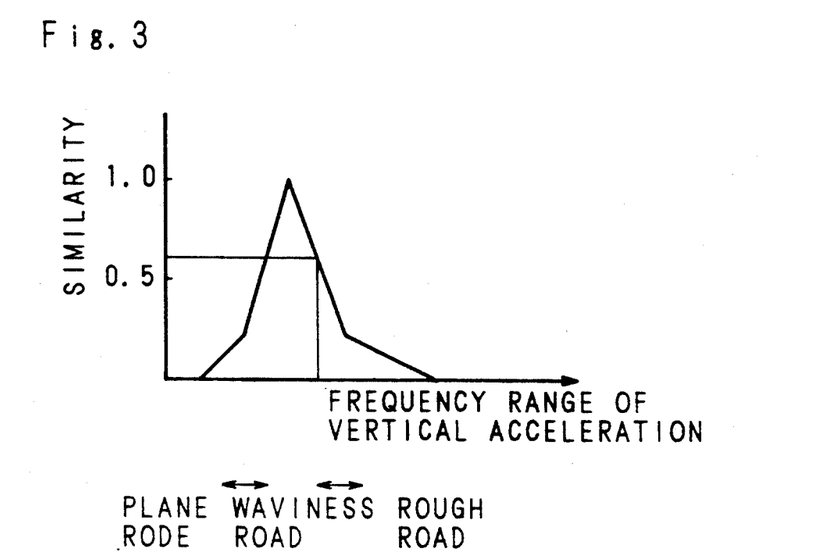
FIG. 3 is a graph showing an antecedent portion of a membership function of fuzzy rule on a waviness road.
Figure 4:
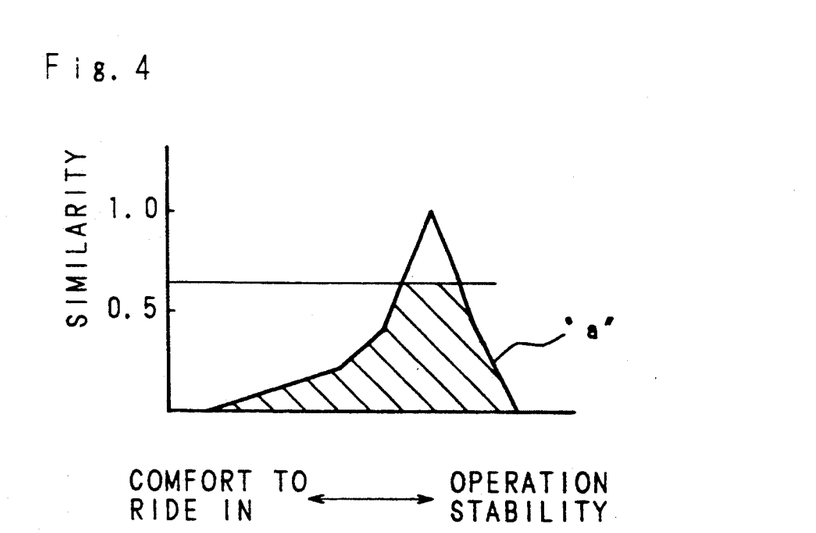
FIG. 4 is a graph showing a consequent portion of the membership function of fuzzy rule on the waviness road.

At Step S2, as shown in FIG. 3, using fuzzy rules, similarity between the frequency ranges of the vertical acceleration as a fuzzy variable and the waviness of the road is calculated from an antecedent portion of the fuzzy rules. In other words, the similarity corresponding to the waviness of a road is calculated. The frequency range showing a peak in a membership function (or map) designating this similarity is an above-spring resonance frequency range of the vehicle body, to be precise, at 1 through 2 Hz. At Step S3, as shown in FIG. 4, according to the similarity obtained at Step S2, the maximum value of the membership function which is a consequent portion of the fuzzy rule is defined and the upper bound thereof is cut to obtain the shaded portion "a", and then, a request index of the comfort to ride and operation stability is calculated in an analogue manner. In FIG. 4, and FIGS. 6, 8, and 9 which will be explained later, the damping force or spring constant of the suspension has a lower value and the torsion quantity of the stabilizer is weaker at the side of "comfort to ride in", each of which are opposite at the side of "operation stability".

Figure 5:
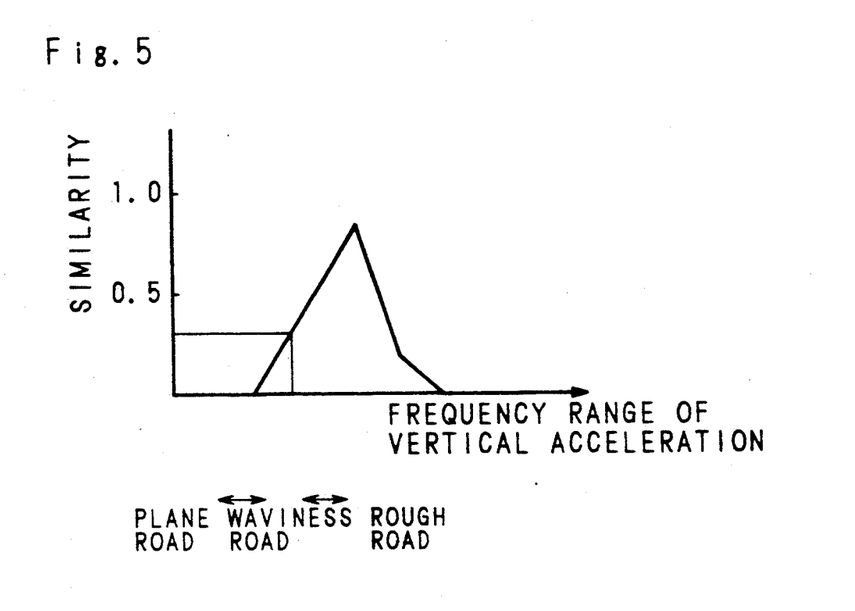
FIG. 5 is a graph showing an antecedent portion of a membership function of fuzzy rule on a rough road.
Figure 6:
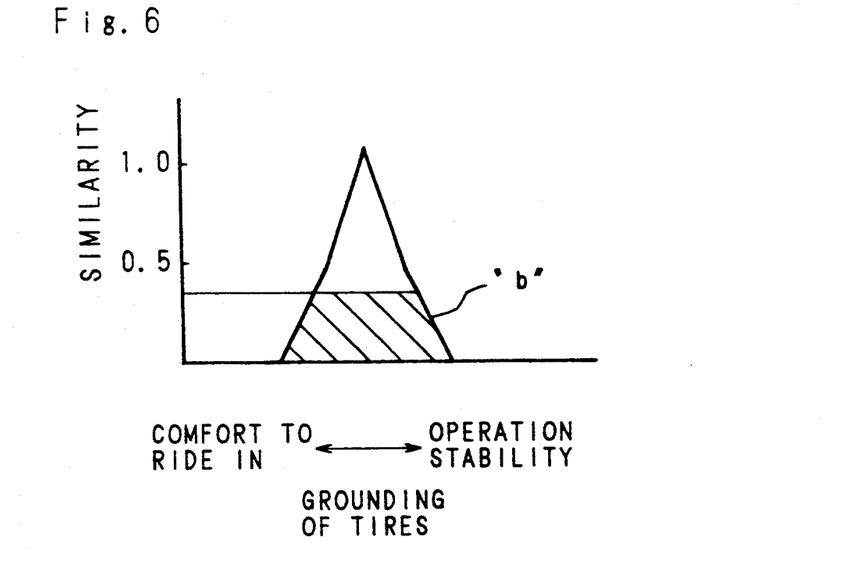
FIG. 6 is a graph showing a consequent portion of the membership function of fuzzy rule on the rough road.

At Step S4, using fuzzy rules with the magnitude of the vehicle vibration of the vehicle body and the vibration frequency being obtained at Step S1, the similarity corresponding to a rough road is calculated from the antecedent portion of the fuzzy rules as shown in FIG. 5. The frequency range showing a peak in the membership function designating this similarity is a below-spring resonance frequency range of the vehicle body, to be more precise, at 10 through 20 Hz. At Step S5, as shown in FIG 6, according to the similarity obtained at Step S4, the maximum value of the membership function which is a consequent portion of the fuzzy rules is defined and the upper bound thereof is cut to obtain the shaded portion "b", and then, a request index of the comfort to ride, operation stability and tire's touch with the ground is calculated an analog manner.

Figure 7:
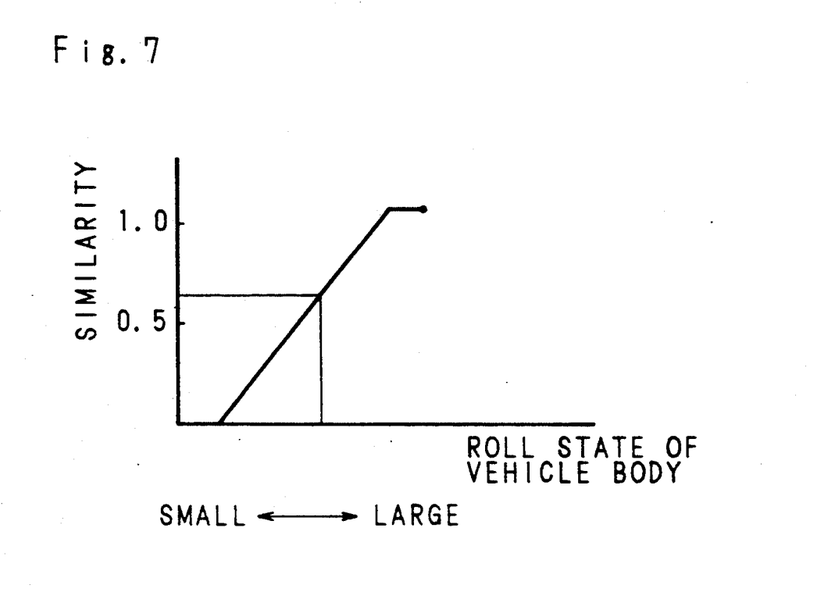
FIG. 7 is a graph showing an antecedent portion of a membership function of fuzzy rule on the roll state.
Figure 8:
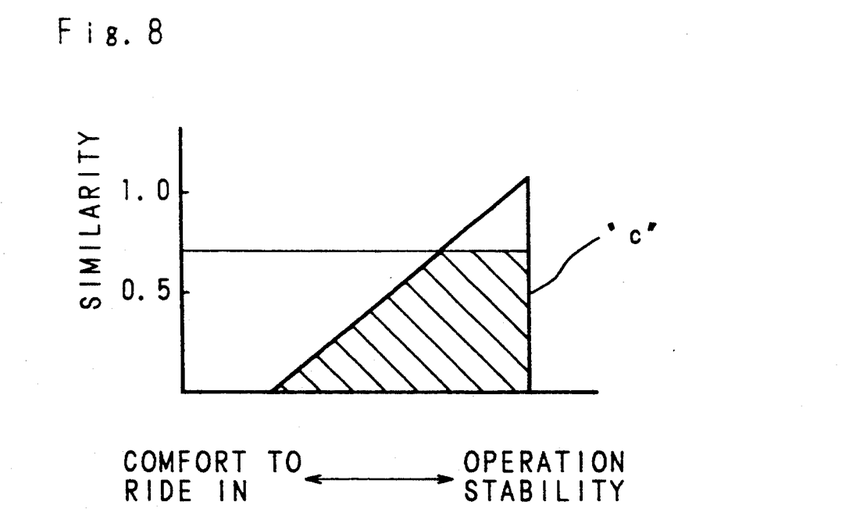
FIG. 8 is a graph showing an antecedent portion of the membership function of fuzzy rule on the roll state.

At Step S6, the vehicle speed is detected by the vehicle speed sensor 13 shown in FIG. 1. At Step S7, the steering angle speed is detected by the steering angle speed sensor 15 shown in FIG. 1. At Step S8, according to the detected vehicle speed and steering angle speed, the roll state of the vehicle body is detected, and as shown in FIG. 7, the similarity corresponding to the roll state of the vehicle body is calculated from an antecedent portion of the fuzzy rules. At Step S9, as shown in FIG. 8, according to the similarity obtained at Step S8, the maximum value of the membership function which is a consequent of the fuzzy rules is defined and the upper bound thereof is cut to obtain the shaded portion "c", and then a request index of the comfort to ride and operation stability is calculated in an analog manner.

At Steps S8 and S9, a combination of the vehicle speed and the steering angle speed is divided into a plurality of ranges to be a fuzzy variable, the similarity between the fuzzy variable and the roll state of the vehicle body is calculated, and a request index of the comfort to ride and operation stability is analoguely calculated. The method of analoguely calculating the request index of the comfort to ride and operation stability is not limited to the above, there may be employed other methods using fuzzy logic shown in FIGS. 7 and 8 just as it is. There may be employed a method in which a combination of the vehicle speed detected by the vehicle speed sensor 13 and the transverse acceleration of the vehicle body detected by the acceleration sensor 12 is divided into a plurality of ranges to be a fuzzy variable and similarity between the fuzzy variable and the roll state of the vehicle body is calculated from FIG. 7, by which the request index of the comfort to ride and operation stability can analoguely be calculated from FIG. 8. There may be employed another method in which the longitudinal acceleration of the vehicle is operated from a differential value of the vehicle speed detected by the vehicle speed sensor 13 to be a fuzzy variable and the similarity between this fuzzy variable and the posture change in the longitudinal direction of the vehicle body is calculated from FIG. 7, by which the request index of the comfort to ride and operation stability can analoguely be calculated from FIG. 8. In that case, it may be adapted that an acceleration sensor (not shown in FIG. 1) for detecting the longitudinal acceleration of the vehicle body is provided in the state detecting unit 2 and that an output value of this acceleration sensor is set to be a fuzzy variable. There may be employed a further method for calculating in an analog manner the request index of the comfort to ride and operation stability from FIG. 8 by setting a combination of the vehicle speed and the throttle opening speed detected by the throttle opening sensor 14 as a fuzzy variable and calculating the similarity between the fuzzy variable and the posture change in the longitudinal direction of the vehicle body from FIG. 7.

At Steps S8 and S9, one request index is analoguely calculated, however, such methods as mentioned above may jointly be employed to calculate a plurality of request indexes, then, the support unit can more precisely be controlled.

Figure 9:
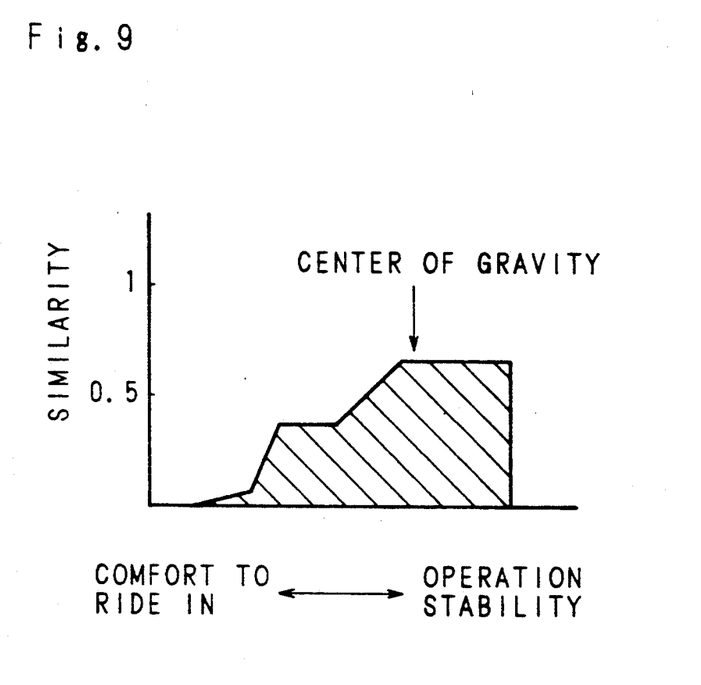
FIG. 9 is a graph showing a membership function designating a result of the final inference.

At Step S10, as shown in FIG. 9, in order to obtain the maximum values, operation to select only the portions with the maximum values of each of the shaded portion "a" being obtained at Step S3, shaded portion "b" being obtained at Step S5 and shaded portion "c" being obtained at Step S9, and the center of gravity is obtained to judge operation values (defuzzy values) of the damping force or spring constant of the suspension, or the torsion quantity of the stabilizer which is necessary to realize the most optimum comfort to ride and operation stability.

At Step S11, it is judged whether control to heighten the damping force, spring constant or torsion quantity has already been carried out or not. And if the control has been carried out (Step S11: YES), the processing goes to Step S12, and if not (Step S11: NO), the processing goes to Step S13.

At Step S12, it is judged whether or not the result of the present operation has the same or higher conditions than the control which has already been carried out. And if the judgment is YES at Step S12, the processing goes to Step S14. At Step S14, a predetermined value of a timer is reset according to the delay time, and if the conditions are the same as those of the control being on execution, the control proceeds, and if higher, the control of the damping force, spring constant, or torsion quantity is changed to be higher and returns. At Step S12, if the judgment is NO, that is, the result of the present operation has conditions lower than those of the control being on execution, at Step S15, it is judged by the value of the timer whether it is within the timer of holding the control. And if the timer is off (Step S15: YES), at Step S16, the processing returns to the SOFT (or MEDIUM) mode which is a basic mode with no condition being formed.

At Step S15, when damping force of the HARD mode or other higher characteristics of the suspension is on hold (Step S15: NO) for example, the processing proceeds to Step S17. At Step S17, it is judged whether the characteristics being judged from the result of calculating the center of gravity at Step S10, that is, the operated result of damping force has conditions lower than those of the control being on execution or not. And if they are lower (Step S17: YES), the processing proceeds to Step S19. At Step S19, it is judged whether the operated results have been formed more than the predetermined number of times or not, and if the judgment is YES, the processing proceeds to Step S20. At Step S20, higher characteristics of tightness of the suspension or stabilizer being on control is changed to be lower, and after a predetermined timer is reset, the processing returns.

At Step S17 or S19, if the judgment is NO, the processing proceeds to Step S18 to maintain the higher control.

At Step S13, it is judged whether conditions to heighten the damping force, spring constant or torsion quantity are formed in the present control or not. And if the judgment is YES at Step S13, the timer is set at Step S21 to execute the higher control. On the other hand, if the judgment is NO at Step S13, the processing returns without executing any control.

In the present embodiment, as a judging reference for changing the higher control being on execution to be lower, the number of times of the lower operated result (Step S19 in FIG. 2) is employed, however, accumulative time of the state of the lower operated result may be employed.

As can be seen from the above description, the characteristics judging unit 3 judges the characteristics of the support unit and outputs a signal of these characteristics to the characteristics switching unit 4 which is an actuator of the suspension or stabilizer 20. In response to the characteristics signal, the characteristics switching unit 4 changeably adjusts the characteristics of the suspension or stabilizer 20.

In the present embodiment, each or either of the damping force or spring constant of the suspension or the torsion quantity of the stabilizer is arranged to be switched into such three modes as SOFT, MEDIUM, and HARD, however, it is needless to say that it may be arranged to be switched into such four modes as SOFT, MEDIUM, HARD, and SUPER HARD or more than five modes.

As has been described above, the fuzzy rule is employed when the characteristics of the support unit (suspension or stabilizer) is controlled in the present invention. Accordingly, where any control condition which is not stored is inputted, similarity between it and the controlling rule which has already been stored is analoguely judged, and the most optimum controlling rule is automatically retrieved from the composed result of similarity between a plurality of controlling rules and is outputted, then, the control can more precisely be realized by few controlling rules. According to the composed result of similarity between the plurality of controlling rules, the center of gravity is computed, then, it is automatically analoguely be judged with a continuous value whether either of the comfort to ride or the operation stability should be satisfied.

According to the computed result using fuzzy logic, once the characteristics (damping force, spring constant, torsion quantity) are heightened, the state of the heightened characteristics is maintained for a predetermined period of time. When a state detecting signal of the vehicle body repeats interruption, or this signal appears for a second and fades in a second, the characteristics can be prevented from being frequently changed and, then, better operation stability can be obtained. And even while the higher characteristics is being maintained, when there are maintained more than the predetermined number of times of the lower operated results in which the center of gravity is operated from similarity which is newly calculated after that, or the accumulative time of the state of the lower operated result is more than a predetermined time, the characteristics are changed to be lower to maintain the lower state for a predetermined period of time. As a result, the characteristics of the suspension can more precisely be controlled with sufficient responsibility without causing any hunting.

With the frequency of vertical acceleration of the vehicle body being set to be a fuzzy variable and the similarity in the membership function with a peak in the above-spring resonance frequency range of the vehicle body, it is adapted to judge comfort to ride which depends on a subjective feeling of man, then, the suspension can be controlled to be suitable for such a subjective feeling. With the frequency of vertical acceleration of the vehicle body being set to be a fuzzy variable and the similarity in the membership function with a peak in the below-spring resonance frequency range of the vehicle body, it is adapted to judge badness of tire's touch with the ground. As a result, softer tire's touch with the surface of the ground can be realized and, then, if the surface of a road is changed when the vehicle is revolving, accelerating or deccelerating, for example, the tire's touch with the ground can easily become suitable for the change of the surface of the ground by changing the damping force from its HARD mode to MEDIUM mode.

There has been provided the vertical acceleration sensor, then, the sensor can more readily be mounted in the vehicle than a leveling sensor. The roll states (roll angle, roll angle speed) operated from the steering angle speed and vehicle speed are employed as a fuzzy variable, and similarity between the roll states is continuously judged. Then, compared to the judgment designated by values "0" and "1" to show the damping force in a map by the prior art method, more suitable control for the actual steering can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A control apparatus for a support unit of a vehicle for controlling characteristics of said support unit for supporting a body of a vehicle, comprising:
    detecting means for detecting a physical quantity which affects characteristics of said support unit and a state quantity which shows movement of said body or said support unit;
    calculating means for calculating a similarity corresponding to said physical quantity and state quantity using fuzzy logic, and calculating request indexes of comfort to ride and operation stability from said calculated similarity;
    judging means for judging the characteristics of said support unit by composing said request indexes to obtain the center of gravity of said request indexes; and
    adjusting means for adjusting the characteristics of said support unit in response to an output of said judging means.

2. A control apparatus for a support unit of a vehicle as set forth in claim 1, wherein said support unit is a suspension, and said characteristics of said support unit comprise damping force and/or spring constant of said suspension.

3. A control apparatus for a support unit of a vehicle as set forth in claim 1, wherein said support unit is a stabilizer, and said characteristics of said support unit comprise a torsion quantity of said stabilizer.

4. A control apparatus for a support unit of a vehicle as set forth in claim 1, wherein said support unit is a suspension and a stabilizer, and said characteristics of said support unit comprise damping force and/or spring constant of said suspension, and said torsion quantity of the stabilizer.

5. A control apparatus for a support unit of a vehicle as set forth in claim 1, wherein said judging means judges said characteristics of said support unit into several modes.

6. A control apparatus for a support unit of a vehicle as set forth in claim 5, wherein when said judging means judges characteristics which are higher than the present state, said adjudging means adjusts the characteristics of said support unit to said higher characteristics and maintains the state of said higher characteristics for a first period of time.

7. A control apparatus for a support unit of a vehicle as set forth in claim 6, wherein said judging means judges characteristics which are lower than the present state in said first period of time, said adjusting means adjusts the characteristics of said support unit to said lower characteristics and maintains the state of said lower characteristics for a second period of time.

8. A control apparatus for a support unit of a vehicle as set forth in claim 6, wherein when said judging means judges characteristics which are lower than the present state more than a predetermined number of times in said first period of time, said adjusting means adjusts the characteristics of said support unit to said lower characteristics and maintains the state of said lower characteristics for a third period of time.

9. A control apparatus for a support unit of a vehicle as set forth in claim 6, wherein when accumulative time in which said judging means judges characteristics which are lower than the present state in said first period of time is over a predetermined time, said adjusting means adjusts the characteristics of said support unit to said lower characteristics and maintains the state of said lower characteristics for a fourth period of time.

10. A control apparatus for a support unit of a vehicle as set forth in claim 5, wherein said judging means judges the characteristics of said support unit into three modes comprising SOFT, MEDIUM, and HARD.

11. A control apparatus for a support unit of a vehicle as set forth in claim 5, wherein said judging means judges the characteristics of said support unit into such four modes as SOFT, MEDIUM, HARD, and SUPER HARD.

12. A control apparatus for a support unit of a vehicle as set forth in claim 1, wherein said detecting means is provided with a sensor for detecting a vertical acceleration of said body, and said calculating means divides a detected acceleration signal of more than a predetermined level into a plurality of predetermined frequency ranges and sets each of said divided acceleration signals as a fuzzy variable and calculates a similarity corresponding to the surface condition of a road with reference to each function having a peak in each predetermined frequency range.

13. A control apparatus for a support unit of a vehicle as set forth in claim 12, wherein said predetermined frequency range is a frequency range corresponding to an above-spring resonance of said body, and said calculating means calculates a similarity corresponding to a waviness of the road.

14. A control apparatus for a support unit of a vehicle as set forth in claim 12, wherein said predetermined frequency range is a frequency range corresponding to a below-spring resonance of said body, and said calculating means calculates a similarity corresponding to a rough road.

15. A control apparatus for a support unit of a vehicle as set forth in claim 1, wherein said detecting means is provided with a sensor for detecting a vehicle speed and a sensor for detecting a steering angle speed, and said calculating means divides a combination of the detected vehicle speed and steering angle speed into a plurality of range to set each of them as a fuzzy variable and calculates a similarity between the fuzzy variable and the roll state of said body.

16. A control apparatus for a support unit of a vehicle as set forth in claim 1, wherein said detecting means is provided with a sensor for detecting a vehicle speed and a sensor for detecting a transverse acceleration of said body, and said calculating means divides a combination of the detected vehicle speed and transverse acceleration into a plurality of ranges and sets each of said divide combinations as a fuzzy variable and calculates a similarity between the fuzzy variable and the roll state of said body.

17. A control apparatus for a support unit of a vehicle as set forth in claim 1, wherein said detecting means is provided with a sensor for detecting a vehicle speed and a sensor for detecting a throttle opening speed, and said calculating means divides a combination of the detected vehicle speed and throttle opening speed into a plurality of ranges and sets each of said divided combinations as a fuzzy variable and calculates a similarity between the fuzzy variable and posture change in a longitudinal direction of said body.

* * * * *